United States Patent
Akeyama

(10) Patent No.: US 8,411,211 B2
(45) Date of Patent: Apr. 2, 2013

(54) PROJECTION TYPE VIDEO DISPLAY DEVICE

(75) Inventor: Tamotsu Akeyama, Osaka (JP)

(73) Assignee: Panasonic Corporation, Osaka (JP)

( * ) Notice: Subject to any disclaimer, the term of this patent is extended or adjusted under 35 U.S.C. 154(b) by 100 days.

(21) Appl. No.: 13/060,509

(22) PCT Filed: Aug. 24, 2009

(86) PCT No.: PCT/JP2009/004068
§ 371 (c)(1),
(2), (4) Date: Feb. 24, 2011

(87) PCT Pub. No.: WO2010/023868
PCT Pub. Date: Mar. 4, 2010

(65) Prior Publication Data
US 2011/0157487 A1 Jun. 30, 2011

(30) Foreign Application Priority Data
Aug. 27, 2008 (JP) ................................ 2008-217691

(51) Int. Cl.
*H04N 3/227* (2006.01)
*H04N 5/64* (2006.01)
*H04N 9/31* (2006.01)
*G03B 21/00* (2006.01)

(52) U.S. Cl. .......... 348/747; 348/744; 348/556; 353/70; 353/101

(58) Field of Classification Search .................. 348/556, 348/558, 744–747, 756, 759; 353/76, 101, 353/70
See application file for complete search history.

(56) References Cited

U.S. PATENT DOCUMENTS

| 5,738,428 A | 4/1998 | McIntyre et al. |
| 5,860,721 A * | 1/1999 | Bowron et al. ............... 353/101 |
| 6,592,228 B1 | 7/2003 | Kawashima et al. |
| 6,869,187 B2 * | 3/2005 | Muramatsu ..................... 353/76 |
| 2008/0074623 A1 | 3/2008 | Odagiri et al. |

FOREIGN PATENT DOCUMENTS

| EP | 1 439 411 | 7/2004 |
| EP | 1 950 609 | 7/2008 |
| JP | 4-365280 | 12/1992 |
| JP | 5-022681 | 1/1993 |
| JP | 6-337651 | 12/1994 |
| JP | 2003-263136 | 9/2003 |
| JP | 2005-072887 | 3/2005 |

* cited by examiner

*Primary Examiner* — Michael Lee
(74) *Attorney, Agent, or Firm* — Hamre, Schumann, Mueller & Larson, P.C.

(57) ABSTRACT

A projection type video display device is provided, which is capable of displaying a plurality of kinds of input videos with different aspect ratios without requiring cumbersome adjustment operations. The device includes a light source (11), a display element (13) for displaying a display video in a display area based on a video signal and modulating illumination light (12) from the light source based on the video signal to form an optical image (14), a projection lens (17) which includes a zoom lens (16) and a focus lens (15), for projecting the optical image on a screen (2), a lens drive part (23) for adjusting the position of the zoom lens and the position of the focus lens, and a projected video control part (31) for controlling a projected video (3) projected on the screen, and the projected video control part drives the lens drive part in accordance with the aspect ratio of the input video, based on the lens position information regarding the zoom lens and the lens position information regarding the focus lens, determined by the aspect ratio of the input video in the video signal.

3 Claims, 18 Drawing Sheets

High-definition video 16:9  d1

51 Panel 16:9  d2

52  Screen 2.35:1  d3

53

PROJECTION TYPE VIDEO DISPLAY DEVICE

TECHNICAL FIELD

The present invention relates to a projection type video display device such as a liquid crystal projector, and in particular, to a projection type video display device capable of displaying a plurality of kinds of input videos with different aspect ratios on a screen properly.

BACKGROUND ART

A projection type video display device such as a liquid crystal projector receives a plurality of kinds of input videos with different aspect ratios, as videos to be displayed, through video signals. The aspect ratio refers to a width-to-height ratio of a video to be displayed or a video signal, or a width-to-height ratio of a display screen on a display element or a display terminal. Hereinafter, regarding an aspect ratio, a width-to-height ratio of a video signal or a display area of a display element will be displayed as "long side (horizontal direction):short side (vertical direction)" in the specification.

For example, an aspect ratio of a video in current TV broadcasting or a video in a general personal computer is 4:3, an aspect ratio of a high-quality video in high-definition broadcasting or the like is 16:9, and an aspect ratio of a CinemaScope movie video is 2.35:1.

On the other hand, in the projection type video display device, a display element such as a liquid crystal panel used as a light valve forming an optical image to be projected has a display area as an area capable of displaying a display video. Needless to say, the aspect ratio of the display area is physically constant for such an element, irrespective of the aspect ratio of an input video.

In recent years, the use of a liquid crystal projector for a home theater, through which a family can enjoy movies and the like, is increasing, since the liquid crystal projector can utilize a large screen easily. As a liquid crystal panel that is a display element of such a liquid crystal projector, those having a display area with an aspect ratio of 16:9 compatible with a high-quality video are used generally. Further, it is preferred that a screen displaying a projected video projected from a liquid crystal projector is fixed to a wall surface so as to ensure video quality. As a screen used in this case, those having the 2.35:1 aspect ratio of a Cinemascope movie video, which is an aspect ratio of the most horizontally oriented video among the videos projected for a home theater, are used often.

Under the above-mentioned circumstances, there is a demand that a plurality of kinds of projected videos with different aspect ratios are displayed on a specific screen, for example, with an aspect ratio of 2.35:1 properly, that is, without extending off the screen and in such a manner that a large projected video is displayed making the most use of the screen.

As one method for solving the above-mentioned problem, a technology is known, in which an input video is electrically converted from an original aspect ratio to be compressed or expanded so as to be fitted to an aspect ratio of a display area of a liquid crystal panel, a video is displayed making the most use of the display area of the liquid crystal panel, the converted aspect ratio is returned to the original aspect ratio of the input video optically by an anamorphic lens, and the input video is projected on a screen (see Patent Document 1).

The projection method in a conventional liquid crystal projector using the anamorphic lens will be described with reference to FIG. 12.

FIG. 12 shows views illustrating how three kinds of input videos with different aspect ratios are displayed by the conventional liquid crystal projector respectively on a liquid crystal panel and a screen. Herein, the case where the aspect ratio of a display area 51 of a liquid crystal panel is 16:9, and the aspect ratio of a screen 52 is 2.35:1 will be described.

FIG. 12A shows an input video a1 in which a video signal is an ordinary TV broadcasting signal, and the aspect ratio of an input video in the video signal is 4:3. In this case, the input video is expanded electrically in a horizontal direction so that the aspect ratio thereof becomes the aspect ratio of 16:9 of the display area 51 of the liquid crystal panel, and displayed on the liquid crystal panel as a display video a2. The display video a2 is expanded optically in a vertical direction by an anamorphic lens and displayed on the screen 52 as a video with the original aspect ratio of 4:3 as shown in a projected video a3. At this time, the right and left sides of the screen 52 are non-display areas 53.

FIG. 12B shows an input video b1 in which a video signal is a high-definition broadcasting signal and the aspect ratio of an input video in the video signal is 16:9. In this case, the aspect ratio of the display area 51 of the liquid crystal panel is the same as that of the input video b1, and the input video b1 is displayed on the display area 51 of the liquid crystal panel as a display video b2 while keeping the width-to-height ratio of the input video b1. Then, the display video b2 is expanded optically in the vertical direction by the anamorphic lens and displayed on the screen 52 as a video with the original aspect ratio of 16:9 as shown in a projected video b3. Even at this time, the right and left sides of the screen 52 are the non-display areas 53.

FIG. 12C shows an input video c1 with an aspect ratio of 2.35:1 in which a video in a video signal is a CinemaScope movie video. In this case, the input video c1 is reduced electrically in the horizontal direction so that the aspect ratio thereof becomes the aspect ratio of 16:9 of the display area 51 of the liquid crystal panel, and displayed on the liquid crystal panel as a display video c2. Then, the display video c2 is expanded and demodulated optically in the horizontal direction by the anamorphic lens and projected on the screen 52 and displayed on the screen 52 as a video with the original aspect ratio of 2.35:1 as shown in a projected video c3.

Thus, in the conventional liquid crystal projector using the anamorphic lens, even with input videos having different aspect ratios, display videos are displayed using the entire display area of the liquid crystal panel. Therefore, the use of the light of the lamp as a light source can be maximized, and a light projected video of high quality can be obtained. Further, according to a projection method in the conventional liquid crystal projector, it is not necessary to adjust the position of a projection lens at a time of switching input videos in switching and projecting input videos with different aspect ratios. Therefore, there also is an advantage that the projection lens of the liquid crystal projector need be set only once when the liquid crystal projector is set.

Prior Art Document

Patent Document

Patent document 1: JP 2005-72887 A

DISCLOSURE OF INVENTION

Problem to be Solved by the Invention

However, the anamorphic lens having a cylindrical curved surface is expensive. Therefore, when the anamorphic lens is used in the liquid crystal projector for a home theater of an ordinary household, a device becomes expensive, which may become one factor for inhibiting the spread thereof.

On the other hand, in the case where the anamorphic lens is not used, the sizes of projected videos on a screen do not become constant if the aspect ratios of input videos are different. Therefore, a projection lens needs to be adjusted every time the aspect ratio of the input video is changed. Further, in the case where an optical axis of projection light is not perpendicular to a screen surface, a projected video extends off the screen. Hereinafter, this problem will be described with reference to the drawings.

FIG. 13 shows views illustrating how input videos with different aspect ratios are displayed on a liquid crystal panel and a screen in the case where the anamorphic lens is not used. In the same way as in FIG. 12, the aspect ratio of the display area 51 of the liquid crystal panel is set at 16:9 and the aspect ratio of the screen 52 is set at 2.35:1 in FIG. 13.

FIG. 13A shows the case where an input signal is a high-definition video signal and the aspect ratio of an input video d1 is 16:9. In this case, the display area 51 of the liquid crystal panel also has the same aspect ratio, and hence, the input video is displayed over the entire display area 51 of the liquid crystal panel as a display video d2. Then, on the screen 52, the input video is displayed as a projected video d3 with the right and left sides being non-display areas 53 since the width-to-height ratio of the screen 52 is large. At this time, the projected video d3 is adjusted by a zoom lens so that the vertical direction thereof is displayed to the full in the vertical direction of the screen 52 in accordance with the distance between the liquid crystal projector and the screen 52, and further, a focus lens is fine-adjusted to focus the projected video d3 on the screen 52 correctly.

When the video signal is changed to a CinemaScope movie video in FIG. 13B in such a state, since the aspect ratio of an input video e1 is 2.35:1, the input video is more horizontally oriented than the display area 51, and the video signal is displayed on the display area 51 of the liquid crystal panel as a display video e2, leaving unused areas 54 in upper and lower portions. The display video e2 is projected on the screen 52 with the same magnification as that of the high-definition video d1 projected previously, and hence, the video signal is displayed as a small projected video e3 without using the entire surface of the screen 52, leaving a non-display area 53 in the periphery. Therefore, it is necessary to readjust the zoom lens to change the projection magnification and fine adjust the focus lens for refocusing so that the input video can be displayed as a proper projected video e4 to the full on the screen 52.

Accordingly, every time an aspect ratio of a video to be projected in a video signal varies, a zoom operation and a focus operation are required, which causes cumbersome operations. Hereinafter, this problem will be referred to as a first problem in the specification.

Further, in the projection type video display device such as a liquid crystal projector, it is preferred to set a device body and a screen so that a projection optical axis that is an optical axis of projection light is perpendicular to the screen surface. This is because, in the case where the projection optical axis is perpendicular to the screen, that is, in the case where the screen is placed to be perpendicular to the ground and the projection optical axis is set to be horizontal to the ground, a projected video of satisfactory quality is obtained without distortions. However, in the case of a home-use liquid crystal projector, generally, a projector device body is set on a ceiling with respect to a screen set on a wall surface, and a video is projected and displayed in such a manner that a projection optical axis is incident upon the screen surface obliquely, from the viewpoint of saving space and keeping an elegant appearance. In the case where the screen surface and the projection optical axis are not perpendicular to each other in this manner, in order to display a video correctly on the screen, a lens shift is performed in which a projection lens is moved in a direction perpendicular to an original projection optical axis. By performing the lens shift, projection light is projected while being shifted from the center of the projection lens and a projection axis is curved. Thus, a video to be projected on the screen has no distortions and can be shifted vertically or horizontally.

In the case of using the lens shift function, the projection optical axis is shifted from the center of the projection lens. Therefore, particularly, in the case where a projection angle is large with the horizontal direction being 0°, for example, in the case where a ceiling is high and a room is small or the like, the center of a projected video moves during zoom adjustment of adjusting the magnification of the projected video, and is shifted from the center of the screen. Consequently, in the case where the correction of a projection magnification is performed by a zoom lens since the aspect ratio of an input video is changed as illustrated in FIG. 13, a projected video f1 extends off the screen 52 as shown in FIG. 14. Hereinafter, this problem will be referred to as a second problem.

The present invention has been achieved in order to solve the above-mentioned problems, and its object is to provide a projection type video display device capable of displaying a plurality of kinds of input videos with different aspect ratios irrespective of an inexpensive device configuration using no anamorphic lens, without using a cumbersome adjustment operation.

Means for Solving Problem

In order to solve the above-mentioned problems, a projection type video display device of the present invention includes: a light source; a display element that displays a display video in a display area based on a video signal and modulates illumination light from the light source with the display video to form an optical image; a projection lens including a zoom lens and a focus lens, which projects the optical image on a screen; a lens drive part that adjusts a position of the zoom lens and a position of the focus lens; and a projected video control part that controls a projected video to be projected to the screen, wherein the projected video control part drives the lens drive part in accordance with an aspect ratio of the input video, based on lens position information of the zoom lens and lens position information of the focus lens, determined by the aspect ratio of the input video in the video signal.

Effects of the Invention

According to the present invention, a projection type video display device can be provided at low cost, which is capable of projecting a proper projected video on a screen automatically without requiring a cumbersome adjustment operation, with respect to a plurality of kinds of input videos with different aspect ratios.

BRIEF DESCRIPTION OF DRAWINGS

FIG. 6 shows views illustrating states of a display video and a projected video before adjustment of the display position shown in FIG. 5.

FIG. 7 shows views illustrating states of a display video and a projected video after adjustment of the display position shown in FIG. 5.

FIG. 10 shows views illustrating states of a display video and a projected video before the display video shown in FIG. 9 is reduced.

FIG. 11 shows views illustrating a display video and a projected video after the display video shown in FIG. 9 is reduced.

FIG. 12 shows states of an input video, a display video, and a projected video in a conventional liquid crystal projector using an amaorphic lens.

FIG. 13 shows states of an input video, a display video, and a projected video in a conventional liquid crystal projector without using an anamorphic lens.

DESCRIPTION OF THE INVENTION

Figure 1:
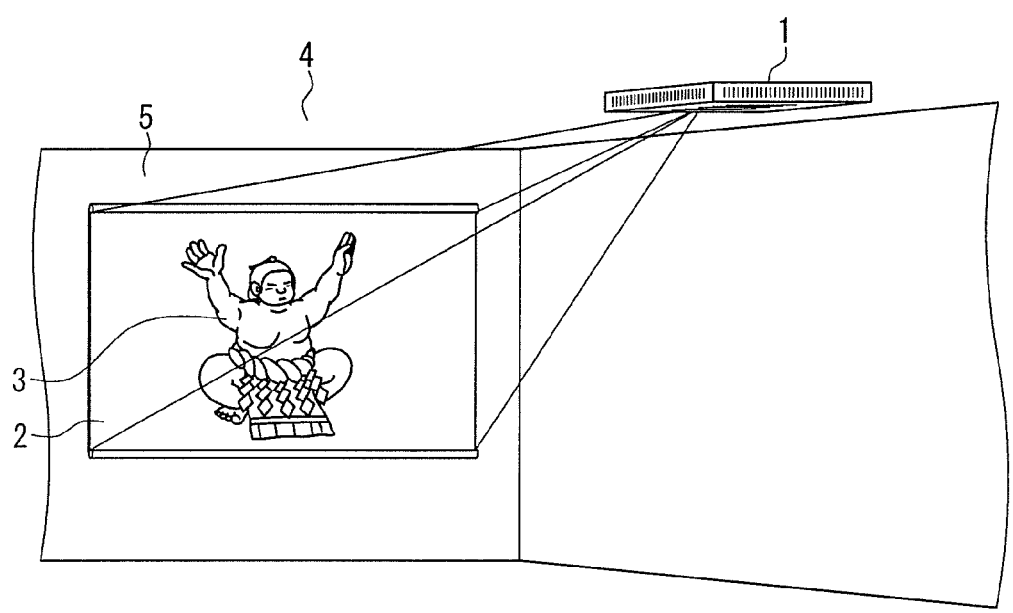
FIG. 1 is a view showing an example of setting of a liquid crystal projector according to Embodiment 1 of the present invention.

A projection type video display device of the present invention includes: a light source; a display element that displays a display video in a display area based on a video signal and modulates illumination light from the light source with the display video to form an optical image; a projection lens including a zoom lens and a focus lens, which projects the optical image on a screen; a lens drive part that adjusts a position of the zoom lens and a position of the focus lens; and a projected video control part that controls a projected video to be projected to the screen, wherein the projected video control part drives the lens drive part in accordance with an aspect ratio of the input video, based on lens position information of the zoom lens and lens position information of the focus lens, determined by the aspect ratio of the input video in the video signal.

According to such a configuration, in the projection type video display device of the present invention, even when video signals are switched to vary the aspect ratio of an input video, the lens drive part is driven based on the lens position information of the zoom lens and the lens position information of the focus lens in accordance with the aspect ratio of the input video, which can place the zoom lens and the focus lens at positions suitable for projecting a video with the aspect ratio. Therefore, input videos with a plurality of kinds of aspect ratios can be projected to the full on a screen while being focused, even without using an expensive anamorphic lens In the configuration of the above-mentioned projection type video display device, it is preferred that the device further includes: a lens shift part drive part that shifts the projection lens in a direction perpendicular to a projection optical axis; and a display position adjusting part that changes a display position of the display video in the display area, wherein the projected video control part allows the display position adjusting part to be operated in accordance with the aspect ratio of the input video, based on the display position information of the display video determined by a shift amount of the projection lens and the aspect ratio of the input video. According to this configuration, even in the case where a lens shift is performed, projected videos with different aspect ratios effectively are prevented from being projected while extending off the screen.

It also is preferred that the device further includes a video reducing part that reduces a size of the display video in the display area, wherein the projected video control part allows the video reducing part to be operated in accordance with the aspect ratio of the input video based on reduction ratio information of the display video determined by the shift amount of the projection lens and the aspect ratio of the input video. According to this configuration, even in the case where a shift amount is large, projected videos with a plurality of kinds of aspect ratios can be projected precisely on the screen without extending off the screen.

It also is preferred that the device further includes an aspect ratio detecting part that detects the aspect ratio of the input video automatically. According to this configuration, a user does not need to set the aspect ratio of an input video any more, and hence, input videos with a plurality of kinds of aspect ratios can be projected on the screen properly without requiring a user to undertake cumbersome operations.

Hereinafter, the case where the projection type video display device of the present invention is used as a home-use liquid crystal projector will be described as an embodiment of the present invention with reference to the drawings.

(Embodiment 1)

FIG. 1 is a view showing an example of a setting state of a liquid crystal projector 1 according to Embodiment 1 of the present invention.

As shown in FIG. 1, the liquid crystal projector 1 of the present embodiment is fixed to a ceiling 4 of a living room and projects a projected video 3 on a screen 2 set on one wall surface 5 of the living room. The aspect ratio of the screen 2 in the present embodiment is 2.35:1, which is an aspect ratio of a CinemaScope movie video.

Figure 2:
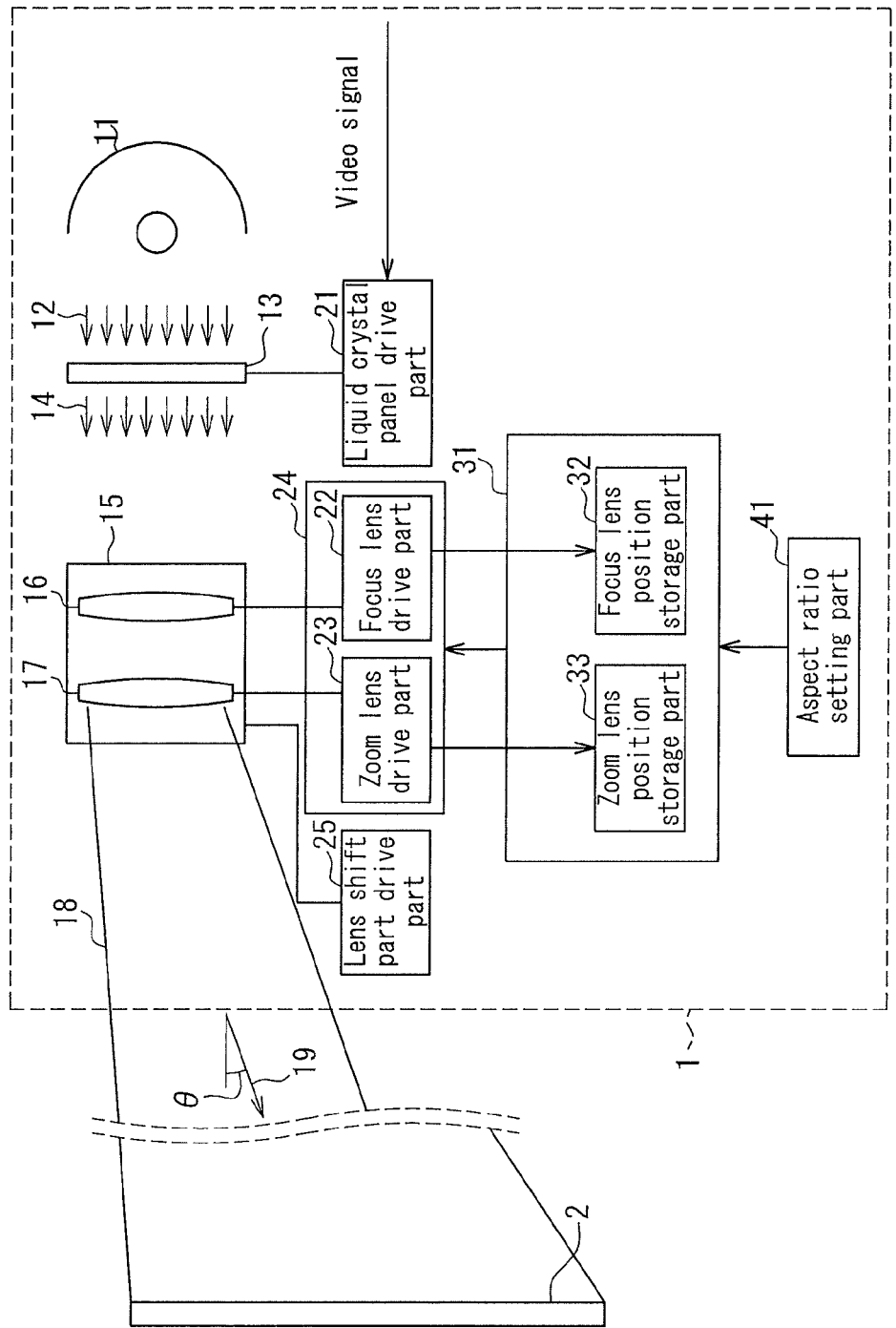
FIG. 2 is a block diagram showing an optical configuration and an electric circuit configuration of the liquid crystal projector according to Embodiment 1 of the present invention.

Next, FIG. 2 is a block structural diagram showing an optical configuration of the liquid crystal projector 1 and a configuration of an electric circuit according to the present embodiment.

As shown in FIG. 2, the liquid crystal projector 1 according to the present embodiment includes a light source 11, a liquid crystal panel 13 that is a display element to be illuminated with illumination light 12 emitted from the light source 11, and a projection lens 15 that projects an optical image 14 formed by the liquid crystal panel 13 on the screen 2.

As the light source 11, a high-luminance lamp such as a well-known mercury lamp, a halogen lamp, or an LED lamp can be used.

As the liquid crystal panel 13, a transmission-type panel is used in the liquid crystal projector 1 of the present embodiment. The liquid crystal panel 13 modulates the illumination light 12 from the light source 11 illuminating a display area (not shown) to form the optical image 14. The aspect ratio of the display area of the liquid crystal panel 13 of the present embodiment is 16:9. For example, in the case where the size of a projected video is about 60 inches to 300 inches, the liquid crystal panel 13 with a size of about 0.5 inches to about 1.2 inches can be used. Further, three panels respectively corresponding to a red color, a blue color, and a green color are used as the liquid crystal panel 13, and projected images of the respective colors are combined into one color video using a dichroic mirror.

The projection lens 15 includes at least a focus lens 16 that focuses the optical image 14 and a zoom lens 17 that adjusts a projection magnification. The focus lens 16 and the zoom lens 17 of the projection lens 15 can control the positions thereof independently. The projected video on the screen 2 can be focused by controlling the position of the focus lens 16 and the size of the projected video, i.e., the projection magnification can be changed by controlling the position of the zoom lens 17.

Further, the projection lens 15 can be shifted by a predetermined amount in a direction perpendicular to a projection optical axis, i.e., an optical axis of the projection lens 15 by a lens shift part drive part 25 described later. By shifting the projection lens 15, the direction of projection light 18 can be curved by an angle θ in a direction of an arrow 19 shown in FIG. 2.

Next, the configuration of an electric circuit of the liquid crystal projector 1 of the present embodiment having the above-mentioned optical configuration will be described. In FIG. 2, each constituent portion of the electric circuit of the liquid crystal projector 1 is shown as a block; however, a circuit configuration performing a predetermined function is merely taken as one block. Thus, the liquid crystal projector 1 of the present embodiment does not have physical constituent elements such as a circuit board corresponding to the respective blocks as shown in FIG. 2.

As shown in FIG. 2, the liquid crystal projector 1 of the present embodiment includes a liquid crystal panel drive part 21 that displays a display video on the liquid crystal panel 13 that is a display element, a lens drive part 24 including a focus lens drive part 22 that adjusts the position of the focus lens 16 and a zoom lens drive part 23 that adjusts the position of the zoom lens 17, the lens shift part drive part 25 for shifting the projection lens 15 in a direction perpendicular to the optical axis of the projection light 18, a projected video control part 31 that controls the position and size of a projected video on the screen 2, and an aspect ratio setting part 41 that selects an aspect ratio of an input video in a video signal.

The liquid crystal panel chive part 21 displays a display video on a display area (not shown) of the liquid crystal panel 13 based on a video signal input to the liquid crystal projector 1. More specifically, the liquid crystal panel drive part 21 receives a predetermined signal from a display electrode (not shown) formed on the liquid crystal panel 13 based on a video signal, and controls the alignment state of liquid crystal molecules of display pixels in a display area (not shown) to display an input video in the video signal at a predetermined position of the display area as a display video. The configuration of the liquid crystal panel 13 and the driving method thereof are the same as those that are well-known conventionally, and hence, the detailed description will be omitted.

The focus lens drive part 22 adjusts the position of the focus lens 16 to adjust a focus of a projected video on the screen 2. Specifically, the focus lens drive part 22 can be realized as a drive mechanism such as a stepping motor for moving the focus lens 16 in a direction parallel to the original optical axis of the projection light 18, i.e., in the horizontal direction in FIG. 2. The focus lens drive part 22 is configured so as to be operated manually by a user of the liquid crystal projector 1. The focus lens drive part 22 also has a function of detecting the position of the focus lens 16 to output the focus lens position information to a focus lens position storage part 32 described later.

The zoom lens drive part 23 adjusts the position of the zoom lens 17 to change the size of a projected video on the screen 2. The zoom lens drive part 23 also can be realized as a drive mechanism such as a stepping motor for moving the zoom lens 17 in a direction parallel to the original optical axis of the projection light 18, i.e., in the horizontal direction in FIG. 2, in the same way as in the focus lens drive part 22. The zoom lens drive part 23 also is the same as the focus lens drive part 22 in that the zoom lens drive part 23 can be configured so as to be operated manually by a user and the zoom lens drive part 23 can detect the position of the zoom lens 17 to output the position information to a zoom lens position storage part 33.

The focus lens drive part 22 and the zoom lens drive part 23 constitute the lens drive part 24.

As described above, the liquid crystal projector 1 of the present embodiment has the lens shift part drive part 25 that shifts the projection lens 15 in a direction perpendicular to the original projection optical axis, i.e., in the vertical direction in FIG. 2 for the purpose of directing the projection light 18 projected from the projection lens 15 to the screen 2 and correcting a trapezoidal distortion or the like of a projected video in the projection light 18 incident diagonally upon the screen 2. As the amount of a lens shift performed by the lens shift part drive part 25 is larger, the angle θ formed by the curved projection light 18 and the horizontal axis becomes larger.

The lens shift part drive part 25 generally is adjusted in a stage of initial setting of the liquid crystal projector 1 and is not used later. Particularly, in the case where the liquid crystal projector 1 is mounted on the ceiling 4 and a projected video is projected on the screen 2 fixed to the wall surface 5 as shown in FIG. 1, the liquid crystal projector 1 and the screen 2 are both fixed. Therefore, if appropriate adjustment is conducted once, it is not necessary to use the lens shift part drive part 25 later.

The liquid crystal projector 1 of the present embodiment is mounted on the ceiling 4 and the screen 2 is mounted on the wall surface 5 as described above, and hence, the projection light 18 cannot be incident upon the screen 2 perpendicularly. Thus, the direction of projection light is changed using the lens shift part drive part 25. However, in the case where the liquid crystal projector 1 is positioned so as to allow the projection light 18 to be incident upon the screen 2 substantially perpendicularly, the lens shift part drive part 25 is not necessarily required. Thus, in the liquid crystal projector 1 of the present embodiment, the lens shift part drive part 25 is not an essential constituent element. Further, means for solving the problems caused in the case where the lens shift part drive part 25 performs a lens shift will be described later as Embodiments 2 and 3.

The liquid crystal projector 1 of the present embodiment has the projected video control part 31 as a circuit configuration. The projected video control part 31 controls the lens drive part 24 so that, in a case where the aspect ratio of an input video in a video signal is changed to a different aspect ratio, the input video with the aspect ratio can be projected to the screen 2 in an optimum state, based on the position information of the focus lens 16 and the position information of the zoom lens 17 determined previously corresponding to the aspect ratio of the input video in the video signal input to the liquid crystal projector 1.

The projected video control part 31 of the present embodiment includes the focus lens position storage part 32 and the zoom lens position storage part 33, as shown in FIG. 2. Further, the projected video control part 31 can be realized as a form of a program input to a CPU, which is capable of controlling the lens drive part 24 and in which the CPU, a RAM, and a ROM (not shown) cooperate.

A position in a projection optical axis direction of the focus lens and a position in a projection optical axis direction of the zoom lens are stored in the focus lens position storage part 32 and in the zoom lens position storage part 33 as the position information of the respective lenses. The position information is updated every time the position of the focus lens 16 or the zoom lens 17 moves and specifically can be obtained as the rotation number of the stepping motor of the focus lens drive part 22 and the zoom lens drive part 23, and the like. Further, in the initial state of the liquid crystal projector 1, i.e., generally at a time of factory shipment, the focus lens position storage part 32 and the zoom lens position storage part 33 previously store the lens position information of the zoom lens 16 and the focus lens 17 for each aspect ratio of an input video, assuming the standard distance between the screen 2 and the liquid crystal projector 1.

The aspect ratio setting part 41 is an operation part for the user of the liquid crystal projector 1 to select the aspect ratio of a video to be projected. The aspect ratio setting part 41 can be realized, for example, as operation buttons displayed as TV broadcasting, Personal computer screen, High-definition video, CinemaScope movie video, and Cinema with subtitles, and when the user selects the kind of a video desired to be projected, the aspect ratio information of the input video is transmitted to the projected video control part 31.

Next, an operation of optimizing the position of the projection lens 15 in the liquid crystal projector 1 of the present embodiment will be described with reference to FIG. 3.

Figure 3:
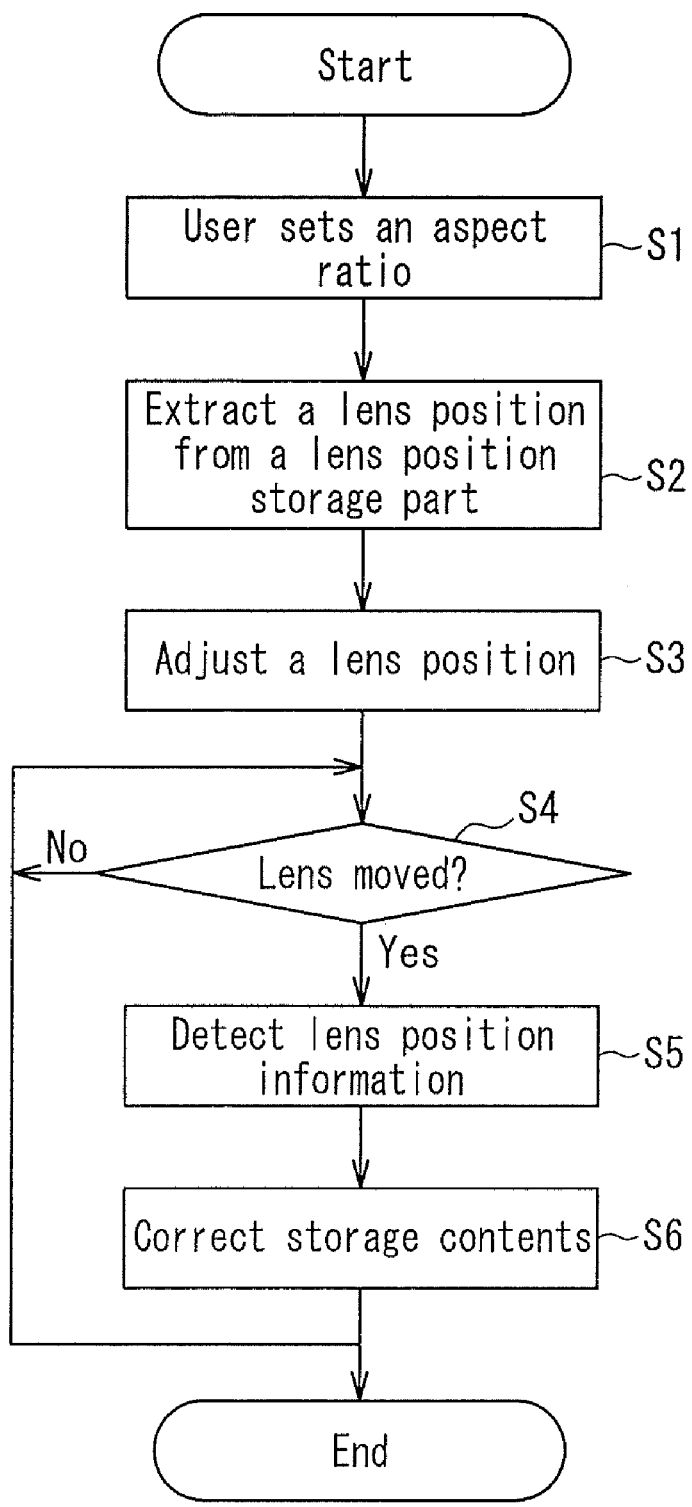
FIG. 3 is a flowchart illustrating an operation of adjusting the position of a projection lens in the liquid crystal projector according to Embodiment 1 of the present invention.

FIG. 3 is a flowchart illustrating a flow of an operation of setting and storing each lens position information of the focus lens 16 and the zoom lens 17 for each aspect ratio of an input video in a video signal in the liquid crystal projector 1 of the present embodiment.

First, in Step S1, the user of the device operates the aspect ratio setting part 41 to select and set the aspect ratio of the input video.

Next, in Step S2, the projected video control part 31 extracts the position information of the focus lens 16 in the aspect ratio selected from the focus lens position storage part 32 and the position information of the zoom lens 17 in the aspect ratio selected similarly from the zoom lens position storage part 33. As described above, in the initial state of the liquid crystal projector 1, the position information of the zoom lens 16 and the focus lens 17 for each aspect ratio of an input video, assuming the standard distance between the screen 2 and the liquid crystal projector 1, is stored.

Next, in Step S3, first, the zoom lens 17 is moved to a predetermined position, and then the focus lens 16 is moved to a predetermined position, based on the lens position information extracted in Step S2. In the stage of Step S3, a projected video is displayed properly on the screen 2, and if a focal point is appropriate, the lens position information stored in the focus lens position storage part 32 and the zoom lens position storage part 33 are not updated. However, in most cases, a proper display is not performed, and hence, the user adjusts the positions of the focus lens 16 and the zoom lens 17 while watching a video actually projected on the screen 2.

At this time, the projected video control part 31 monitors each lens position via the zoom lens drive part 23 and the focus lens drive part 22. Upon detecting the movement of the lens in Step S4, the projected video control part 31 detects the lens position information in a state in which the movement is stopped in the subsequent Step S5. Whether or not the movement of the lens is stopped is determined as follows. In the case where the lens position is not changed for a predetermined period of time, for example, 5 seconds, it can be determined that the lens is stopped at that position, and this stopped position is set as new lens position information.

Then, the detected new lens position information of the lens is overwritten and updated to the information previously stored in the focus lens position storage part 32 and the zoom lens position storage part 33 in Step S6.

On the other hand, in the case where the movement of the lens is not detected in Step S4, it can be determined that each lens position information stored in the focus lens position storage part 32 and the zoom lens position storage part 33 is still correct lens position information.

The movement of the lens is monitored at all times even after Step S6, and if the lens is moved, the information is updated to new lens position information.

Thus, when an operation of storing lens position information is completed regarding the aspect ratio of one input video, the same operation is repeated for the respective input videos having different aspect ratios.

After the operation of storing lens positions is completed regarding the input videos with all the aspect ratios is completed, when the user of the device merely selects and sets the aspect ratio of an input video from the aspect ratio setting part 41, the projected video control part 31 moves the projection lens 15 based on the stored lens position information to bring the focus lens 16 and the zoom lens 17 into positions where an optimum projected video is obtained. Therefore, the user only needs to select the aspect ratio of an input video, and the first problem of the conventional projection type video display device, in which the lens operations of zooming and focusing are required every time the aspect ratio of an input video in a video signal is varied, causing the operations to be cumbersome, can be solved.

(Embodiment 2)

Next, as the second embodiment of the projection type video display device of the present invention, a liquid crystal projector will be described, which effectively can solve the second problem in which a projected video is shifted from a screen when the projection lens is shifted in a direction perpendicular to the optical axis of the projection light.

Figure 4:
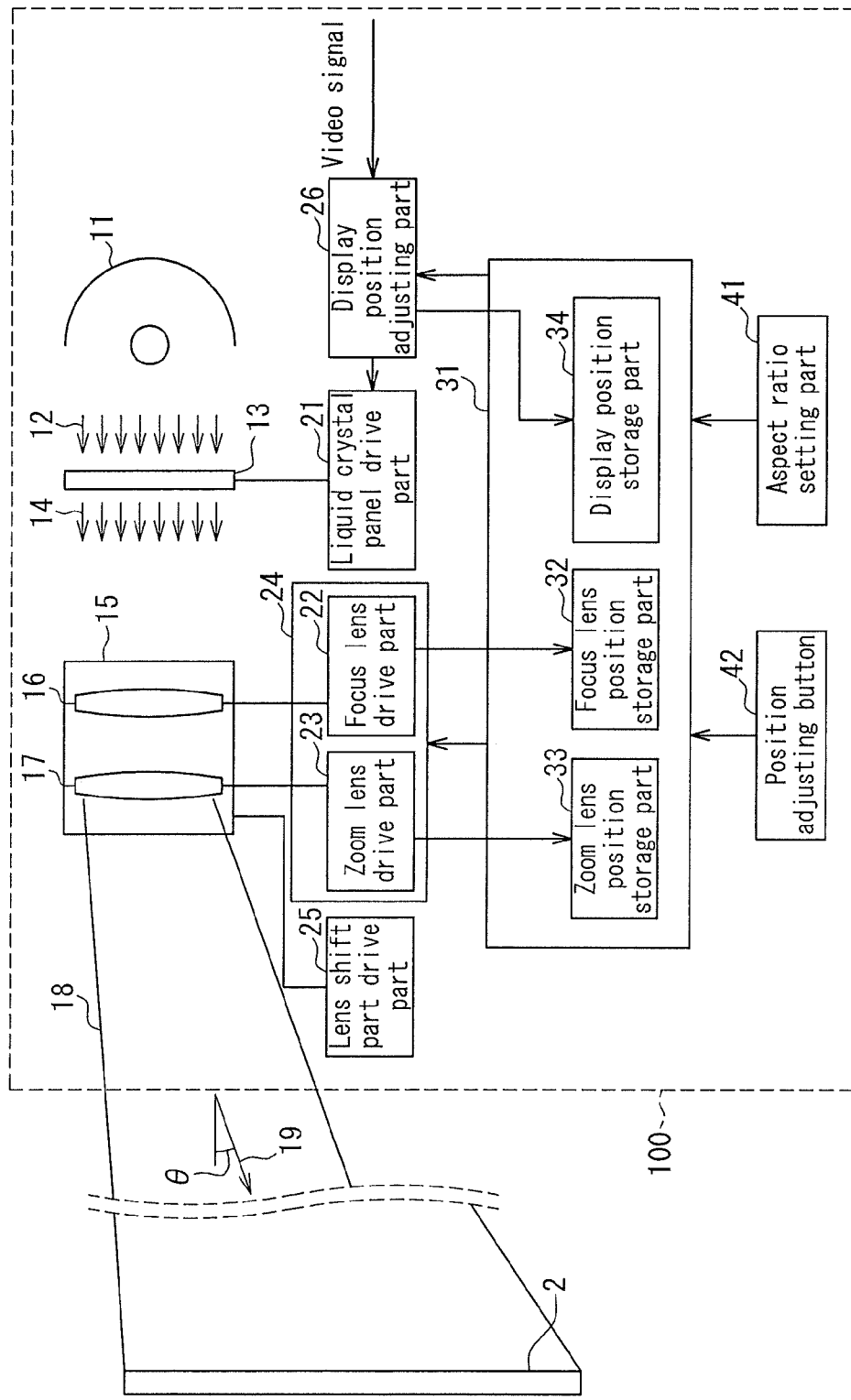
FIG. 4 is a block diagram showing an optical configuration and an electric circuit configuration of a liquid crystal projector according to Embodiment 2 of the present invention.

FIG. 4 is a block structural diagram showing an optical configuration and a configuration of an electric circuit of a liquid crystal projector 100 of Embodiment 2 of the present invention. In FIG. 4, in the same way as in FIG. 2, each constituent portion of the electric circuit of the liquid crystal projector 100 shown as a block merely indicates a circuit configuration performing a predetermined function as one block, and thus, the liquid crystal projector 100 of the present embodiment does not have physical constituent elements such as a circuit board corresponding to the respective blocks as shown in FIG. 4.

As shown in FIG. 4, the liquid crystal projector 100 according to Embodiment 2 has the same optical configuration as that of the liquid crystal projector 1 according to Embodiment 1 described with reference to FIG. 2.

Further, regarding the circuit configuration, the liquid crystal projector 100 according to Embodiment 2 is different from the liquid crystal projector 1 according to Embodiment 1 in that the liquid crystal projector 100 includes a display position adjusting part 26 controlled by the projected video control part 31 and a video signal is input to the liquid crystal panel drive part 21 via the display position adjusting part 26, the projected video control part 31 has a display position storage part 34, and further the liquid crystal projector 100 has a position adjusting button 42 operated by the user. In the liquid crystal projector 100 according to Embodiment 2, the lens shift part drive part 25 is an essential constituent element, which also is different from the liquid crystal projector 1 according to Embodiment 1. Therefore, hereinafter; parts particular to the liquid crystal projector 100 according to Embodiment 2 will be described mainly, and the descriptions of parts common to those in the liquid crystal projector 1 according to Embodiment 1 will be omitted.

The liquid crystal projector 100 according to Embodiment 2 shown in FIG. 4 includes the display position adjusting part 26. The display position adjusting part 26 changes and adjusts the display position of a display video in a display area of the liquid crystal panel 13 that is a display element. The liquid crystal panel 13 that is a display element of the liquid crystal projector 100 of the present embodiment has a display area with an aspect ratio of 16:9, i.e., an area capable of displaying a display video. Herein, in the case where the aspect ratio of an input video in a video signal is 16:9, this aspect ratio is the same as that of the display area capable of displaying a display video, and hence, the display video is displayed to the full in the display area. However, in the case where the aspect ratio of an input video is not 16:9, the aspect ratio of the display area is different from that of the display video, and non-display areas in which a display video is not displayed are generated in upper and lower portions or right and left portions of the display area. Therefore, the display video can be displayed in an area other than the center of the display area. The display position adjusting part 26 adjusts a video signal input to the liquid crystal panel drive part 21 to display the display video in a portion other than the center of the display area of the liquid crystal panel 13.

The display position storage part 34 of the liquid crystal projector 100 of the present embodiment receives a signal from the display position adjusting part 26 and stores display position information regarding at which position of the display area of the liquid crystal panel 13 the display position adjusting part 26 has adjusted to display the display video.

Further, in the liquid crystal projector 100 of the present embodiment, the projected video control part 31 has a function of controlling the display position adjusting part 26 to change and adjust the display position in the display area, in response to an operation of the position adjusting button 42 by the user, acquiring display position information from the display position storage part 34, and controlling the display position adjusting part 26 based on the display position information to adjust the display position of the display video in the display area of the liquid crystal panel 13.

The position adjusting button 42 is a rotary or push button that provides a predetermined signal to the display position adjusting part 26 via the projected video control part 31 to enable the user to adjust the display position of a display video in the display area of the liquid crystal panel 13.

Next, the operation of adjusting the display position in the liquid crystal projector 100 of the present embodiment will be described specifically with reference to FIGS. 5 to 7.

Figure 5:
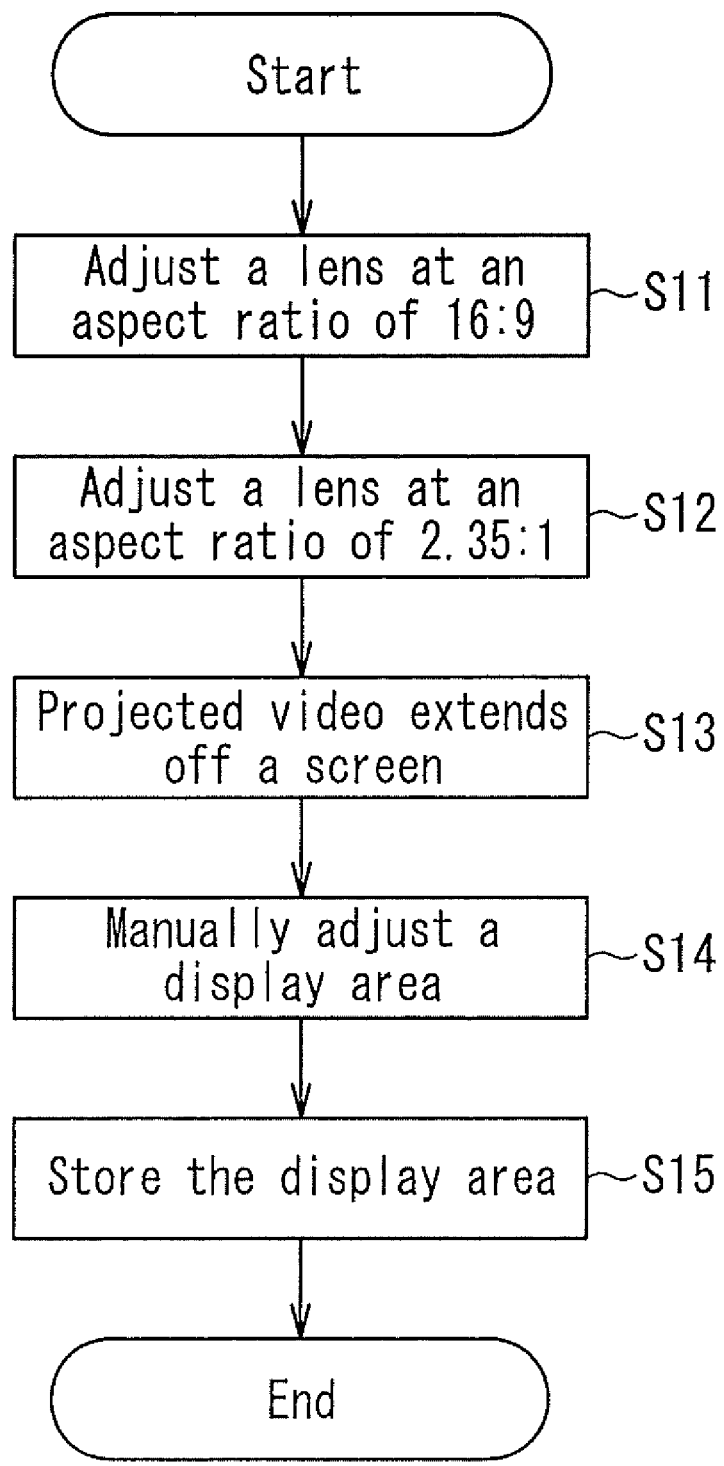
FIG. 5 is a flowchart illustrating an operation of adjusting the display position in a display area of a liquid crystal panel in the liquid crystal projector according to Embodiment 2 of the present invention.

FIG. 5 is a flowchart illustrating an operation of adjusting the display position in the case where a projected video extends off the screen 2 when an input video with a different aspect ratio is projected on the screen 2 in the liquid crystal projector 100 of the present embodiment.

First, it is assumed that, in Step S11, the user of the liquid crystal projector 100 operates the aspect ratio setting part 41 to select 16:9 that is the aspect ratio of a high-definition video as an aspect ratio of an input video. At this time, the user controls the lens drive part 24 to adjust the lens positions of the focus lens 16 and the zoom lens 17 in accordance with a procedure for setting and storing the lens position information of the focus lens 16 and the zoom lens 17 described in Embodiment 1 with reference to FIG. 3 so that the projected video 3 is projected on the screen 2 properly.

Next, in Step S12, the lens positions of the focus lens 16 and the zoom lens 17 are adjusted in accordance with the procedure shown in FIG. 3 with the aspect ratio of an input video being the 2.35:1 aspect ratio of a CinemaScope movie video. At this time, in the case where the lens shift part drive part 25 provides a large lens shift amount and a projection direction 19 of the projection light 18 is curved largely from the horizontal axis, that is, in the case where the angle θ is large, a phenomenon in which the projected video extends off the screen 2 occurs. This state will be referred to as Step S13.

Figure 6A:
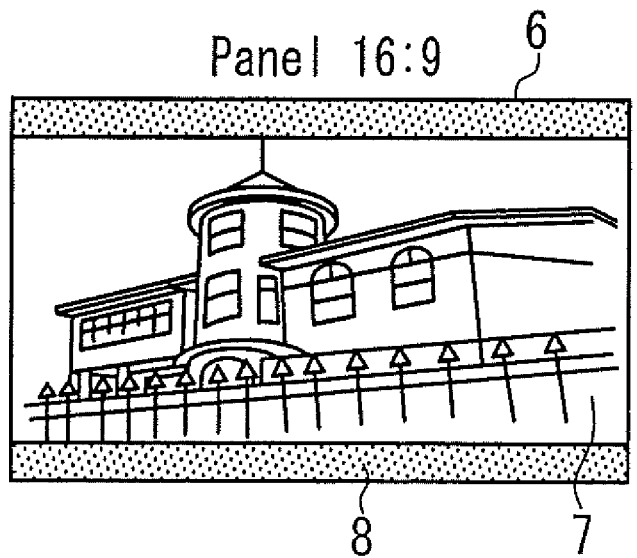
FIG. 6A shows a state of a display video in the display area of the liquid crystal panel.
Figure 6B:
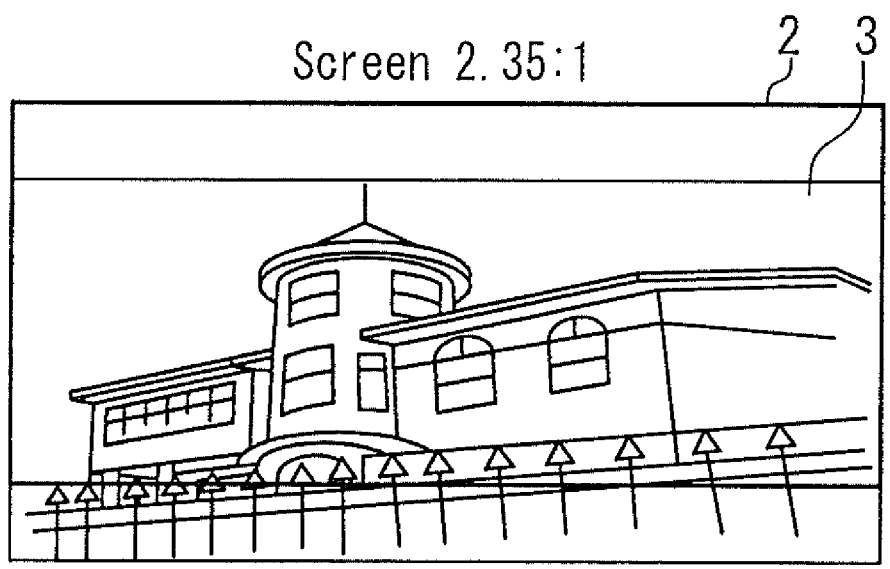
FIG. 6B shows a state of a projected video on a screen.

FIG. 6B shows a state of the screen 2 at this time. Although the projected video 3 is projected correctly to the full in the horizontal direction of the screen 2, the projected video 3 is projected at a position shifted in a downward direction with respect to the screen 2, and a lower portion of the projected video 3 extends off the screen 2. When the projected video 3 extends off the screen 2, as shown in FIG. 6A, the center portion of the display area 6 of the liquid crystal panel 13 and the center portion of the display video 7 are displayed so as to be matched with each other. Since the aspect ratio of the display video 7 is larger in the horizontal direction, compared with that of the display area 6, non-display areas 8 in which the display video is not displayed are generated in upper and lower portions of the display area 6.

Figure 7A:
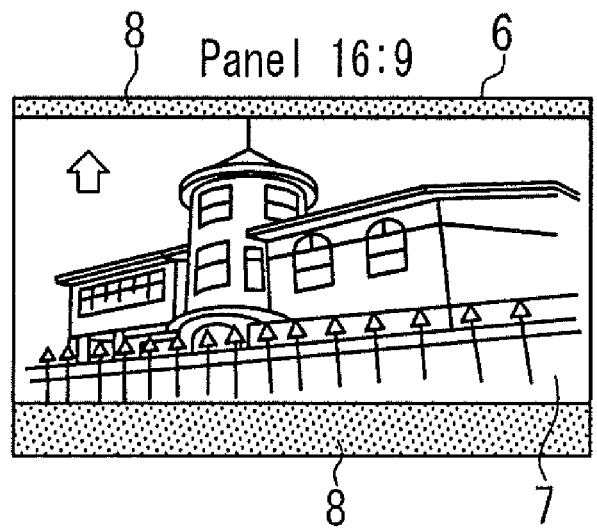
FIG. 7A shows a state of the display video in the display area of the liquid crystal panel.
Figure 7B:
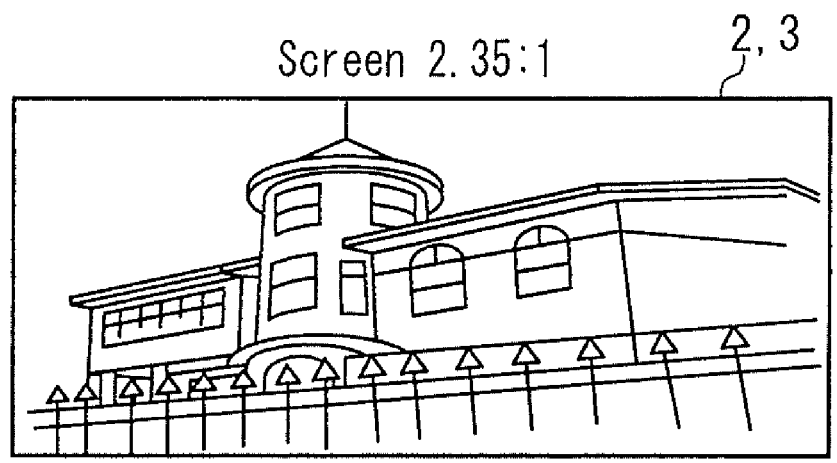
FIG. 7B shows a state of a projected video on the screen.

Returning to FIG. 5, in the subsequent Step S14, the user operates the position adjusting button 42, and adjusts the display position so that the projected video 3 is matched with the screen 2 as shown in FIG. 7B while watching the screen 2.

FIG. 7A shows the display position of the display video 7 in the display area 6 in a state where the screen 2 and the projected video 3 are matched with each other by the operation of the position adjusting button 42 shown in FIG. 7B. As shown in FIG. 7A, the display video 7 is displayed while being shifted upward in the figure of the display area 6, and the non-display area 8 in the upper portion of the display video 7 is smaller than the non-display area 8 in the lower portion of the display video 7.

Next, returning to FIG. 5, in Step S15, the display position information of the display video 7 in the display area 6 is associated with the aspect ratio 2.35:1 of a CinemaScope movie video and stored in the display position storage part 34.

In the case where a CinemaScope movie video is set in the aspect ratio setting part 41, the projected video control part 31 acquires display position information of the display video 7 in the display area 6 of the liquid crystal panel 4 stored in the display position storage part 34, and corrects the position of the projection lens 15 and simultaneously adjusts the display position automatically. Therefore, even if the user does not operate the position adjusting button 42, the projected video 3 is projected on the screen 2 correctly.

Thus, in the case where the projection lens 15 is shifted in a direction perpendicular to the projection optical axis in the lens shift part drive part 25, a second problem in which the projected video 3 extends off the screen 2 may be caused if the display video 7 remains positioned at the center of the display area 6. However, in the liquid crystal projector 100 of the present embodiment, the second problem is solved, and the projected video 3 with a different aspect ratio can be projected on the screen 2 exactly without the user performing complicated processing.

(Embodiment 3)

Next, as the third embodiment of the projection type video display device of the present invention, a liquid crystal projector capable of effectively solving the problem that a projected video is largely shifted from a screen, which occurs in the case where the amount of a shift of the projection lens in a direction perpendicular to the optical axis of projection light will be described.

Figure 8:
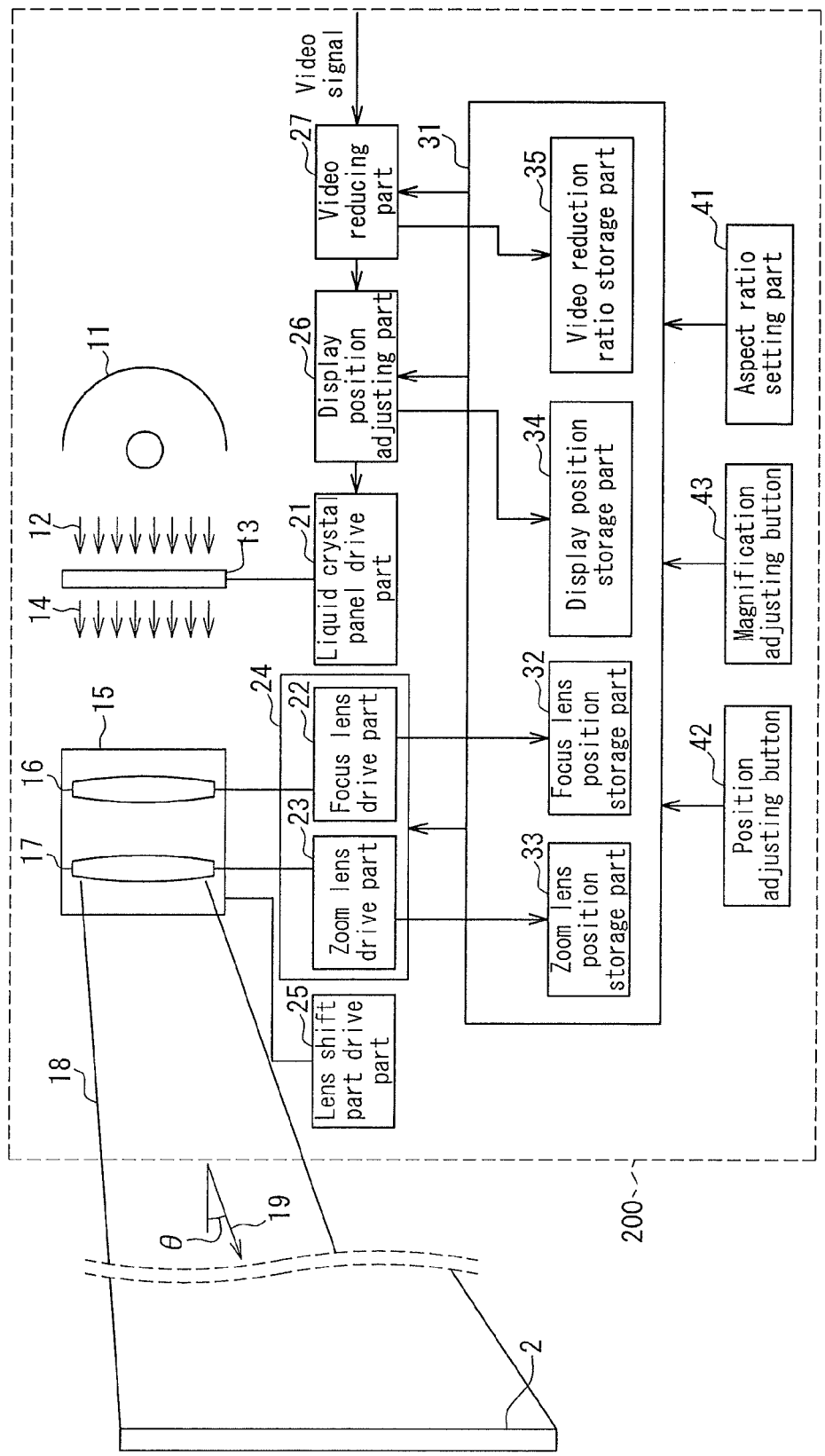
FIG. 8 is a block diagram showing an optical configuration and an electric circuit configuration of a liquid crystal projector according to Embodiment 3 of the present invention.

FIG. 8 is a block structural diagram showing an optical configuration and an electric circuit configuration of the liquid crystal projector 200 of the third embodiment according to the present invention. In the same way as in FIGS. 2 and 4, FIG. 8 does not show that the liquid crystal projector 200 shown as a block has physical components such as a circuit board corresponding to each block as shown in FIG. 8.

As shown in FIG. 8, the liquid crystal projector 200 according to the third embodiment has the same optical configuration as that of the liquid crystal projector 100 according to the second embodiment described with reference to FIG. 4.

Further, in the circuit configuration, the liquid crystal projector 200 according to the third embodiment is different from the liquid crystal projector 100 according to the second embodiment in that the liquid crystal projector 20 according to the third embodiment includes a video reducing part 27 controlled by the projected video control part 31 and a video signal is input to the display position adjusting part 26 and further to the liquid crystal panel drive part 21 via the video reducing part 27, the projected video control part 31 includes a video reduction ratio storage part 35, and further, the liquid crystal projector 200 according to the third embodiment includes a magnification adjusting button 43 that is a second adjusting button operated by the user. Even in the liquid crystal projector 200 according to the third embodiment, the lens shift part drive part 25 is an indispensable constituent element. In the following, parts peculiar to the liquid crystal projector 200 according to the third embodiment will be described mainly, and the description of parts common to those of the liquid crystal projector 100 according to the second embodiment will be omitted.

The liquid crystal projector 200 according to the third embodiment shown in FIG. 8 includes the video reducing part 27. The video reducing part 27 changes the size of a display video in the display area of the liquid crystal panel 13 that is a display element and displays the display video as a smaller video. Therefore, while the video reducing part 27 is being operated, the liquid crystal panel 13 that is a display element of the liquid crystal projector 200 of the present embodiment does not display a display video to the full in the horizontal direction of the display area, and the display video is displayed with the center thereof displaced from the center of the display area by the display position adjusting part 26 described in Embodiment 2.

The video reduction ratio storage part 35 of the liquid crystal projector 200 of the present embodiment receives a signal from the video reducing part 27, and stores reduction ratio information indicating what reduction ratio of the display video in the liquid crystal panel 13 is set by the video reducing part 27 for each aspect ratio of an input video.

Further, in the liquid crystal projector 200 of the present embodiment, the projected video control part 31 has a function of designating a reduction ratio of a display video to the video reducing part 27 in response to the operation of the magnification adjusting button 43 by the user, acquiring reduction ratio information from the video reduction ratio storage part 35, controlling the vide reducing part 27 based on the reduction ratio information, and adjusting the reduction ratio of the display video in the display area of the liquid crystal panel 13.

The magnification adjusting button 43 is a button for providing a predetermined signal to the video reducing part 27 via the projected video control part 31, and enabling the user to adjust the display magnification of the display video in the display area of the liquid crystal panel 13. The magnification adjusting button 43 is a rotation-type or push-type button.

Next, the operations of the magnification adjustment and the display position adjustment of a display video in the liquid crystal projector 200 of the present embodiment will be described specifically with reference to FIGS. 9 to 11.

Figure 9:
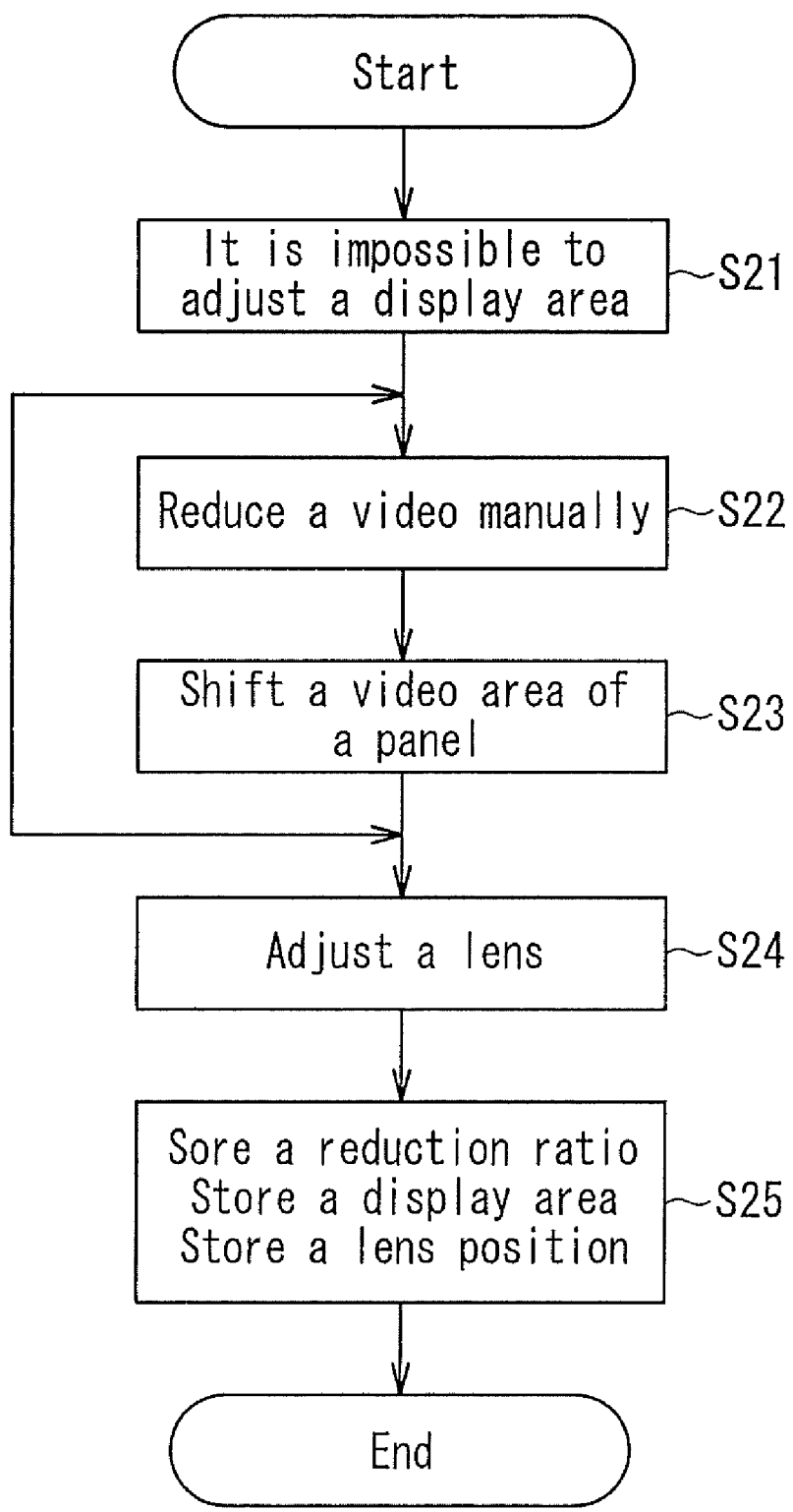
FIG. 9 is a flowchart illustrating operations of reducing a display video in a display area of a liquid crystal panel and adjusting the display position in the liquid crystal projector according to Embodiment 3 of the present invention.

FIG. 9 is a flowchart showing an operation of adjusting the reduction ratio and the display position of a display video in the case where a projected video extends off the screen 2 when an input video with a different aspect ratio is projected onto the screen 2.

First, the case is assumed in which the user of the liquid crystal projector 200 operates an aspect ratio setting part 41 and selects the aspect ratio of an input video to be 16:9 of a high-definition video in the same way as in Embodiment 2. At this time, the user controls the lens driving part 24 to adjust the lens positions of the focus lens 16 and the zoom lens 17 so that the projected video 3 is projected onto the screen 2 properly, in accordance with the procedure described in Embodiment 1, using the flow of the operation shown in the flowchart of FIG. 3. Further, the display position in the display area of a display video is adjusted, using the flow of the operation shown in the flowchart of FIG. 5.

Figure 10A:
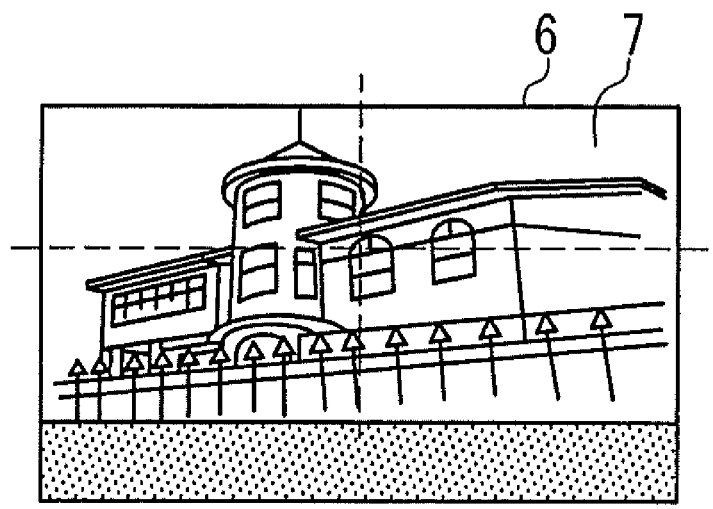
FIG. 10A shows a state of a display video in the display area of the liquid crystal panel.
Figure 10B:
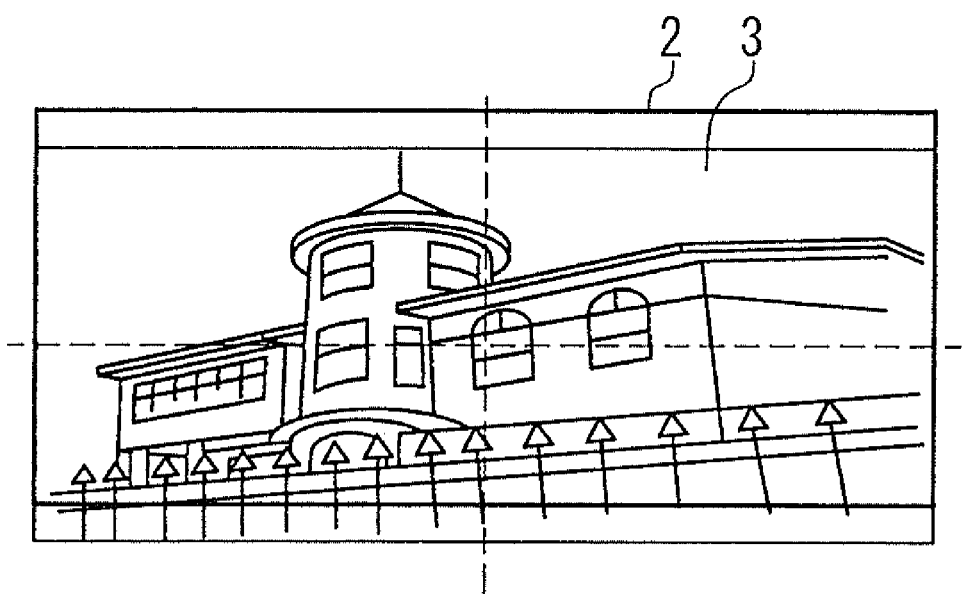
FIG. 10B shows a state of a projected video on a screen.

However, when the shift amount in the lens shift part drive part 25 is large, i.e., when a projection angle θ shown in FIG. 8 is extremely large, even if the display position of the display video 7 is adjusted up to the upper limit of the display area 7 as shown in FIG. 10A in Step S14 of FIG. 6, the projected video 3 may extend off the screen 2 as shown in FIG. 10B. This case corresponds to Step S21 of the flowchart shown in FIG. 9.

In such a case, as the subsequent Step S22, the user changes the display magnification of the display video 7 in the display area 6 by operating the magnification adjusting button 43 to reduce the size of the display video 7.

Figure 11A:
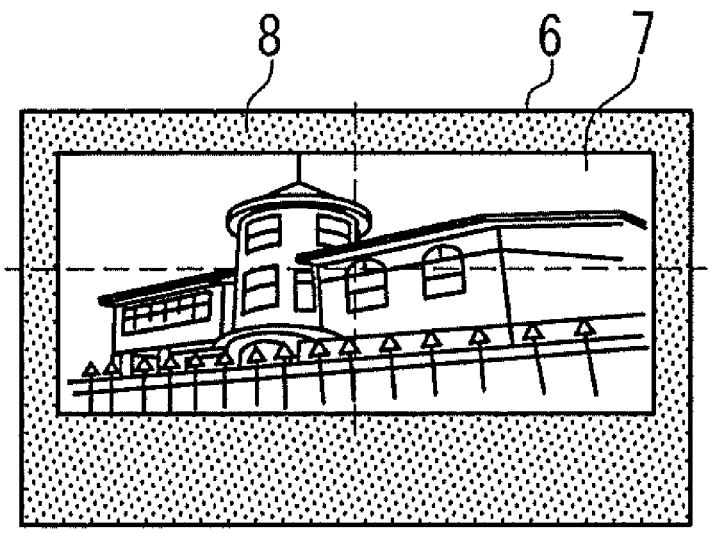
FIGS. 11A and 11C show states of the display video in the display area of the liquid crystal panel.
Figure 11B:
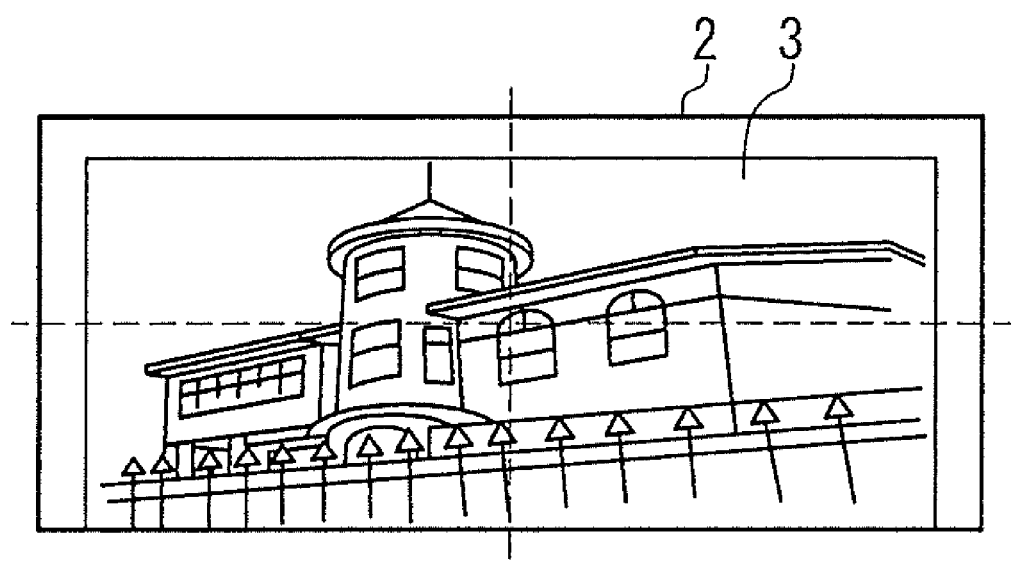
FIGS. 11B, 11D, and 11E show states of the projected video on the screen.

At this time, the projected video control part 31 reduces the size of a video input in a video signal in the video reducing part 27 in accordance with the operation of the magnification adjusting button 42. In the video reducing part 27, the input video in the video signal to be input to the liquid crystal panel drive part 21 is reduced via the display position adjusting part 26. Therefore, in the display area 6 of the liquid crystal panel 13, as shown in FIG. 11A, only the size of the display video 7 is reduced while the center position of the display video 7 remains constant, compared with the case of FIG. 10B. Consequently, the non-display area 8 is generated on an upper side of the display video 7 in the display area 6. As shown in FIG. 11B, the magnification of the projected video 3 is reduced even on the screen 2.

Figure 11C:
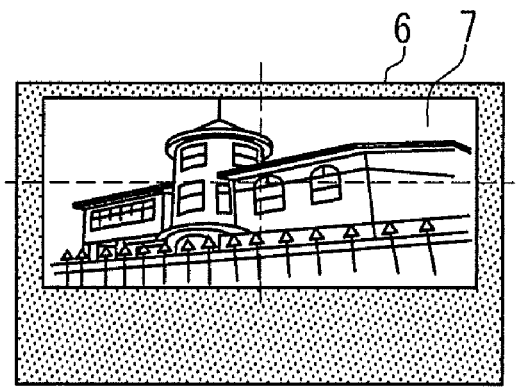

Next, as shown in Step S23 in the flowchart of FIG. 9, the user operates the position adjusting button 42 to provide an instruction to the display position adjusting part 26 via the projected video control part 31 while viewing the screen 2, and moves the position of the display video 7 in the display area 6 further upward as shown in FIG. 11C. Consequently, the projected video 3 is moved upward.

Figure 11D:
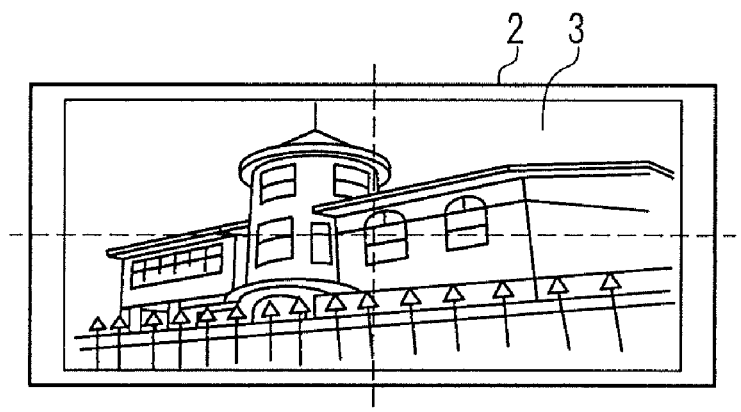

This operation is repeated until the center of the screen 2 is matched with the center of the projected video 3, as shown in FIG. 11D.

Figure 11E:
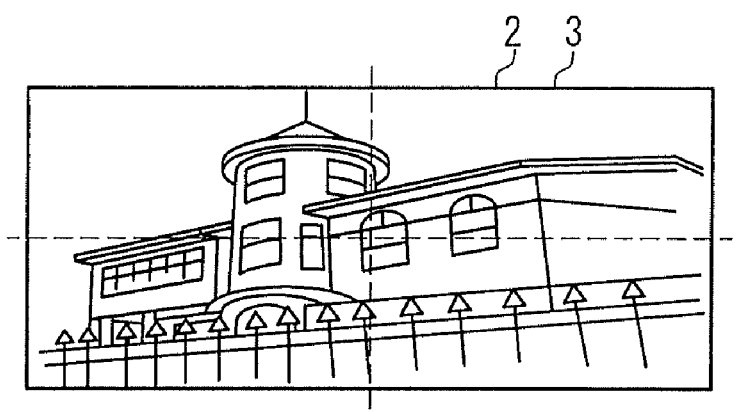
Figure 12A:
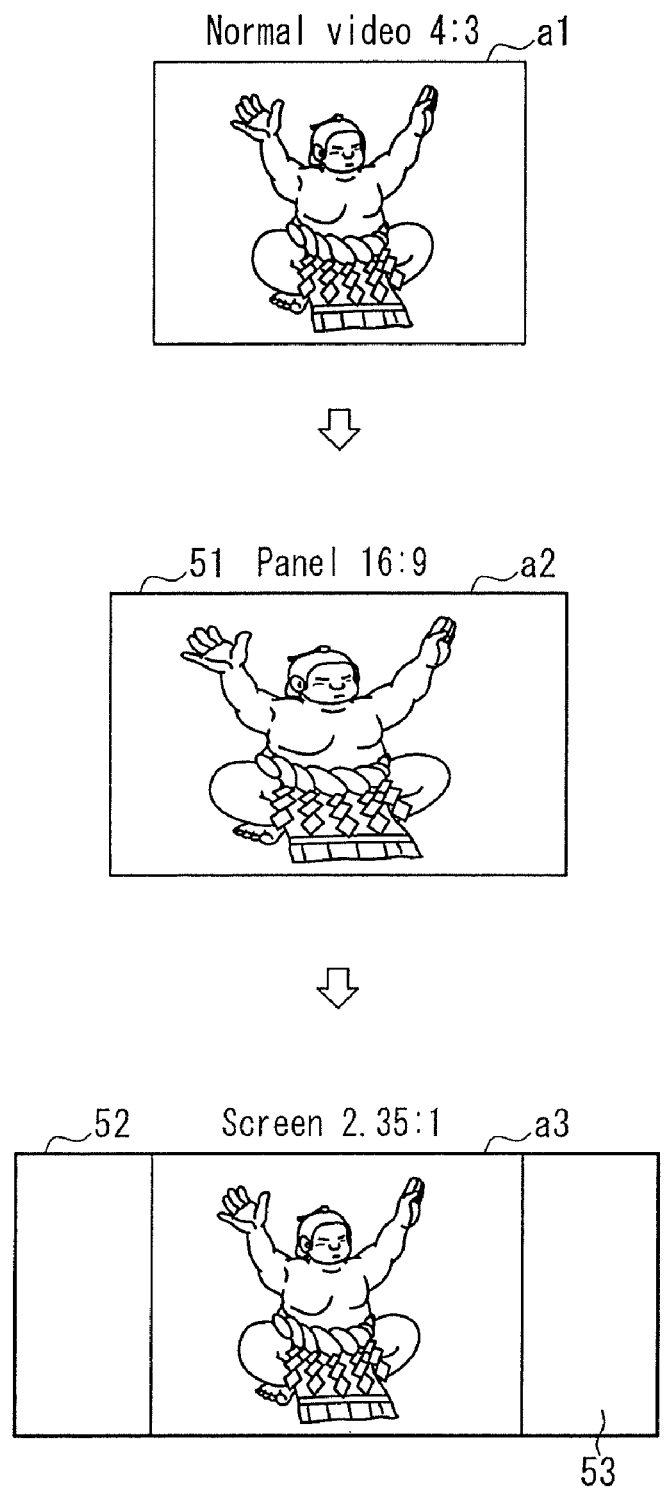
FIG. 12A shows the case where the aspect ratio of the input video is 4:3.
Figure 12B:
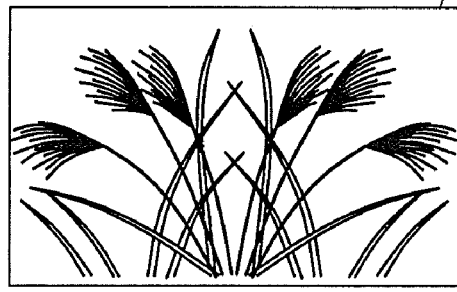
FIG. 12B shows the case where the aspect ratio of the input video is 16:9.
Figure 12B:
Figure 12B:
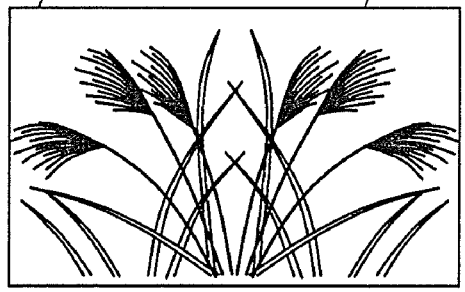
Figure 12B:
Figure 12B:
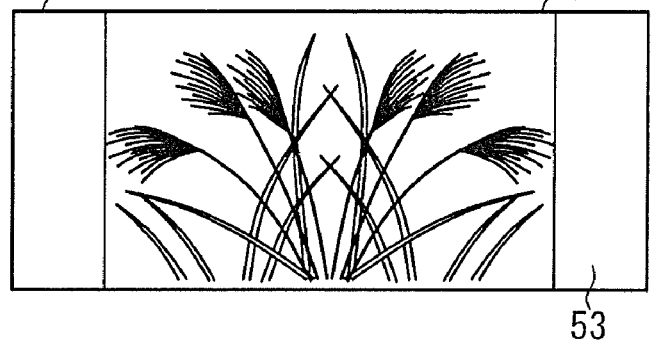
Figure 12C:
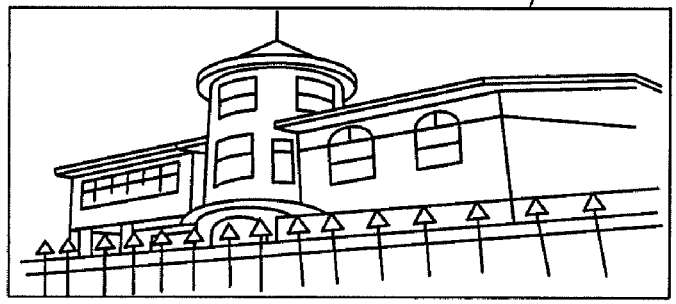
FIG. 12C shows the case where the aspect ratio of the input video is 2.35:1.
Figure 12C:
Figure 12C:
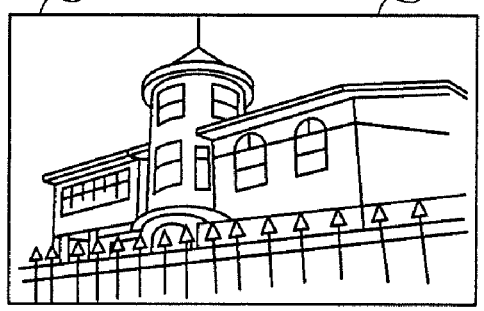
Figure 12C:
Figure 12C:
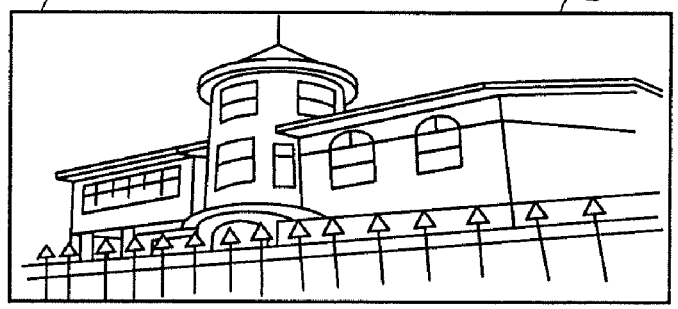
Figure 13A:
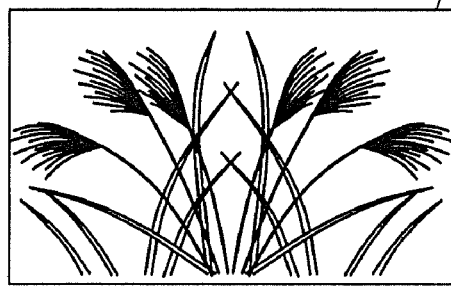
FIG. 13A shows the case where the aspect ratio of the input video is 16:9.
Figure 13A:
Figure 13A:
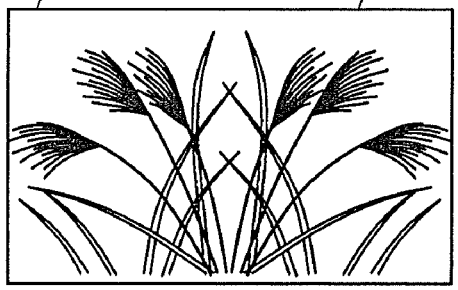
Figure 13A:
Figure 13A:
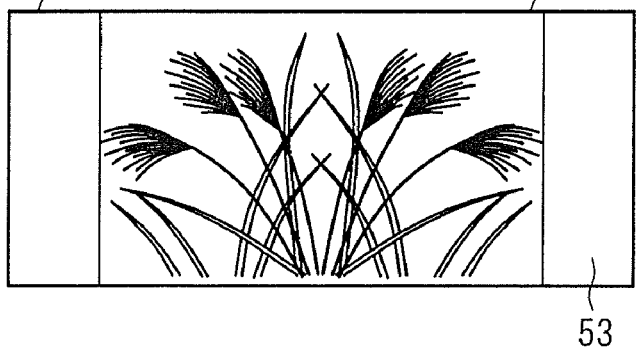
Figure 13B:
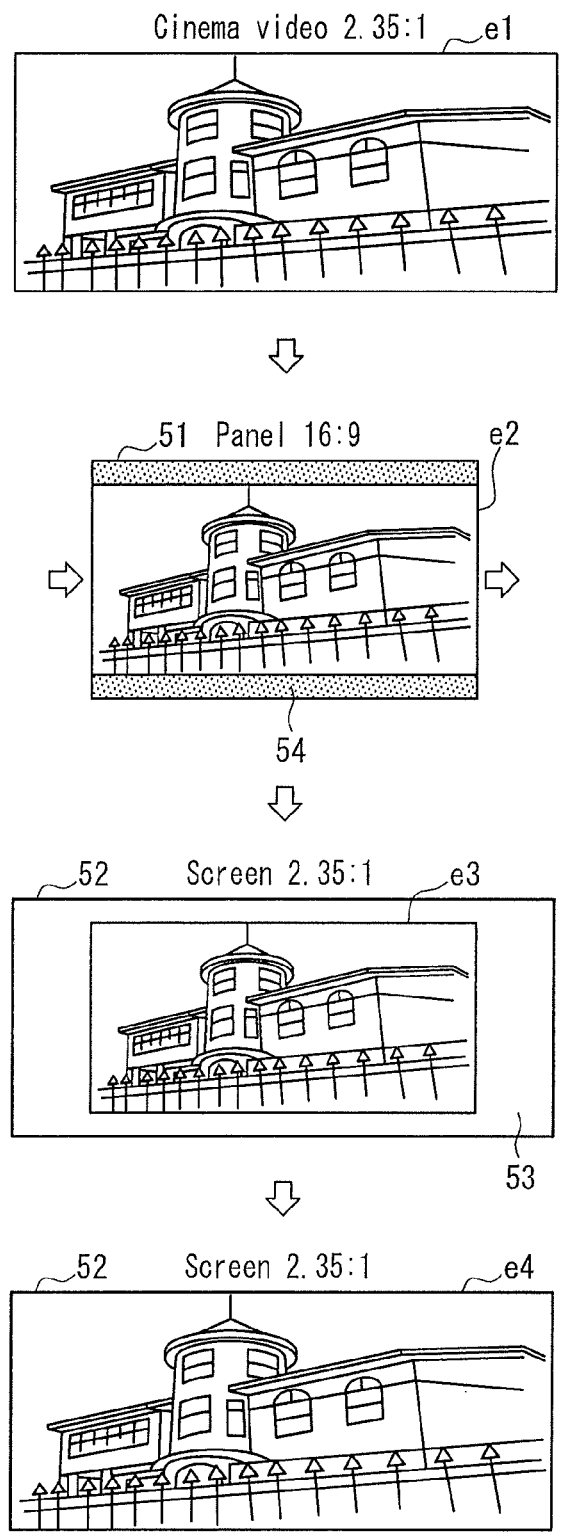
FIG. 13B shows the case where the aspect ratio of the input video is 2.35:1.
Figure 14:
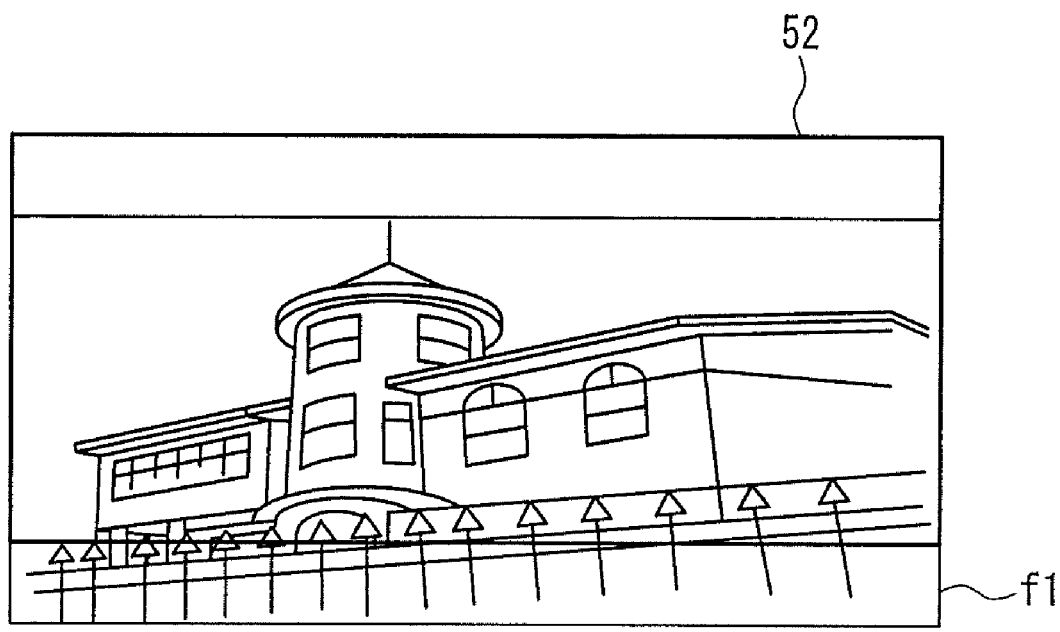
FIG. 14 shows a state in which the projected video in the conventional liquid crystal projector extends off a screen.

As shown in FIG. 11D, in the case where the center of the screen 2 is matched with the center of the projected video 3, the user operates the projection lens drive part 24 and adjusts the position of the zoom lens 17 by the zoom lens drive part 23 to convert the projection magnification as the subsequent Step S24. Further, the user adjusts the position of the focus lens 16 if required and focuses the projected video 3 correctly onto the screen 2. Thus, the projected video 3 displayed to the full over the screen 2 can be obtained without extending off the screen 2, as shown in FIG. 11E.

In the subsequent Step S25, the projected video control part 31 associates the reduction ratio of the adjusted display video with the aspect ratio 2.35:1 of a CinemaScope movie video and stores the resultant reduction ratio in the video reduction ratio storage part 35. Simultaneously, the display position information at this time is stored in the display position storage part 34, and the positional information on the focus lens 16 and the zoom lens 17 is stored in the focus lens position storage part 32 and the zoom lens position storage part 33.

Hereinafter, every time the user sets the aspect ratio of an input video by the aspect ratio setting part 41, the projected video control part 31 reads focus lens position information, zoon lens position information, display position information, and reduction ratio information respectively from the focus lens position storage part 32, the zoom lens position storage part 33, the display position storage part 34, and the video reduction ratio storage part 35, and controls the lens drive part 24, the display position adjusting part 26, and the video reducing part 27 respectively. Thus, the projected video 3 can be projected properly onto the screen 2.

Thus, in the liquid crystal projector 200 of the present embodiment, for example, even in the case where a projector body and the screen 2 are close to each other, and the projection lens is shifted largely by the lens shift part drive part 25 to set the projection angle θ to be extremely large, an input video with a different aspect ratio automatically can be projected correctly on the screen 2 without requiring cumbersome adjustment by the user.

In the second and third embodiments, the case where the input video is switched from a high-definition video with an aspect ratio of 16:9 to a CinemaScope movie video with an aspect ratio of 2.35:1 has been illustrated. However, the projection-type video display device of the present invention is not limited to such a case, and needless to say, similar effects can be exhibited even with respect to various combinations of aspect ratios of input videos such as a combination of a high-definition video and a subtitled cinema.

Further, in the above-mentioned description of the present invention, the case where the user inputs an aspect ratio of an input video to the projected video control part 31 via the aspect ratio setting part 41 in the liquid crystal projector described as each embodiment has been illustrated. However, the projection type video display device of the present invention is not limited thereto, and for example, can be designed so as to have an aspect ratio detecting part capable of automatically detecting an aspect ratio of an input video in a video signal, as a function of the projected video control part 31. Thus, the need for cumbersome operations by the user can be reduced further by allowing the projected video control part 31 to detect an aspect ratio of an input video automatically.

Further, in each embodiment, a household liquid crystal projector such as a home theater has been illustrated as the projection type video display device of the present invention. However, the projection type video display device of the present invention is not limited to the household type, and needless to say, can be applied to projectors to be set in public institutions such as a station and a museum and projectors for business purposes to be set in a conference room and a hall.

Further, as the display element, a liquid crystal projector using a transmission type liquid crystal panel has been illustrated. However, the display element of the projection type video display device of the present invention is not limited to such a transmission type liquid crystal panel. For example, a reflection type liquid crystal panel that modulates illumination light from a light source by reflecting it by a back electrode can be used as the display element. Further, besides the liquid crystal panel, any display element such as a micro mirror element in which a number of fine mirrors are placed as display pixels in a display area can be used as the display element of the present invention, as long as it is capable of modulating illumination light from a light source to form a projected image to be projected by a projection lens.

Further, in the above-mentioned description of each embodiment, the aspect ratio of the display area in the liquid crystal panel that is a display element of a liquid crystal projector is set at 16:9 and the aspect ratio of a screen is set at 2.35:1. However, needless to say, the aspect ratios of the display area of the display element in the projection type video display device of the present invention and the screen are not limited to those illustrated above.

Industrial Applicability

The present invention can be used widely as a projection type video display device that displays a plurality of input videos with different aspect ratios on a screen.

The invention claimed is:

1. A projection type video display device, comprising:
a light source;
a display element that displays a display video in a display area based on a video signal and modulates illumination light from the light source with the display video to form an optical image;
a projection lens including a zoom lens and a focus lens, which projects the optical image on a screen;
a lens drive part that adjusts a position of the zoom lens and a position of the focus lens;
a projected video control part that controls a projected video to be projected to the screen,
a lens shift part drive part that shifts the projection lens in a direction perpendicular to a projection optical axis; and
a display position adjusting part that changes a display position of the display video in the display area,
wherein the projected video control part drives the lens drive part in accordance with an aspect ratio of the input video, based on lens position information of the zoom lens and lens position information of the focus lens, determined by the aspect ratio of the input video in the video signal, and wherein the projected video control part allows the display position adjusting part to be operated in accordance with the aspect ratio of the input video, based on the display position information of the display video determined by a shift amount of the projection lens and the aspect ratio of the input video.

2. The projection type video display device according to claim 1, further comprising a video reducing part that reduces a size of the display video in the display area, wherein the projected video control part allows the video reducing part to be operated in accordance with the aspect ratio of the input video based on reduction ratio information of the display video determined by the shift amount of the projection lens and the aspect ratio of the input video.

3. The projection type video display device according claim 1, further comprising an aspect ratio detecting part that detects the aspect ratio of the input video automatically.

* * * * *